United States Patent [19]
Qandil

[11] Patent Number: 6,079,958
[45] Date of Patent: Jun. 27, 2000

[54] DRY-PIT SUBMERSIBLE PUMP HAVING A FAN AND A TORQUE-RELIEVING MECHANISM

[75] Inventor: Mark Qandil, Camas, Wash.

[73] Assignee: Roper Holdings, Inc., Wilmington, Del.

[21] Appl. No.: 08/943,396

[22] Filed: Oct. 3, 1997

[51] Int. Cl.$^7$ .................................................. F04B 17/03
[52] U.S. Cl. ...................... 417/319; 417/423.3; 417/53; 416/204 R
[58] Field of Search .................................. 417/423.3, 53, 417/319, 423.5, 424.1, 201; 416/204 R, 207, 240, 169 R, 241 A, 220 R

[56] References Cited

U.S. PATENT DOCUMENTS

| | | | |
|---|---|---|---|
| 1,651,881 | 12/1927 | Frickey | 415/112 |
| 2,164,485 | 7/1939 | Yantis | 464/37 |
| 2,460,849 | 2/1949 | Senn | 416/240 |
| 2,687,249 | 8/1954 | Papanek et al. | 415/123 |
| 2,991,051 | 7/1961 | Jones | 416/240 |
| 3,746,472 | 7/1973 | Rupp | 417/9 |
| 4,078,480 | 3/1978 | Luck | 99/476 |
| 4,306,838 | 12/1981 | Trainer | 416/135 |
| 4,446,391 | 5/1984 | Sekine et al. | 310/62 |
| 4,566,855 | 1/1986 | Costabile et al. | 416/134 R |
| 4,604,035 | 8/1986 | Roberts | 417/319 |
| 5,028,211 | 7/1991 | Mordue et al. | 416/204 R |
| 5,244,348 | 9/1993 | Karls et al. | 416/204 R |
| 5,322,416 | 6/1994 | Karls et al. | 416/204 R |
| 5,418,412 | 5/1995 | Brucker | 310/75 R |
| 5,622,481 | 4/1997 | Thut | 417/319 |
| 5,642,986 | 7/1997 | Rose | 416/240 |

FOREIGN PATENT DOCUMENTS

| | | |
|---|---|---|
| 0739079A1 | 10/1996 | European Pat. Off. . |
| 3802949 | 8/1989 | Germany . |
| 58-036151 | 3/1983 | Japan . |

*Primary Examiner*—Charles G. Freay
*Assistant Examiner*—Robert Z. Evora
*Attorney, Agent, or Firm*—Kolisch, Hartwell, Dickinson, McCormack & Heuser

[57] ABSTRACT

A dry-pit submersible pump using a totally enclosed fan-cooled (TEFC) electric motor to power the pump. A release mechanism prevents the fan from creating excessive drag when submerged in water. The fan cools the motor when the water level is below the motor, and the surrounding water combines with the fan to cool the motor when the water level rises to at least partially surround the motor. When the fan is at least partially submerged, the release mechanism substantially prevents the fan from imposing a load on the motor due to the surrounding water. The release mechanism can take the form of a shear key, a torque-release clutch or flexible fan blades.

17 Claims, 2 Drawing Sheets

DRY-PIT SUBMERSIBLE PUMP HAVING A FAN AND A TORQUE-RELIEVING MECHANISM

BACKGROUND AND SUMMARY OF THE INVENTION

This invention is related to the field of pumps. More particularly, this invention is related to the field of dry-pit submersible pumps.

Broadly speaking, pumps can be classified into two types: dry and submersible. Submersible pumps are used where both the pump and motor must be placed in the water to be pumped. In deep wells, for instance, it is necessary to locate the pump and motor at the bottom of the well and "push" water up because it is not possible to pull water up from a depth greater than approximately 30 feet. While motors for submersible pumps can be made rather compact because of the efficient cooling provided by the surrounding water, they are relatively expensive to manufacture and therefore only used where absolutely necessary.

Dry pumps, in contrast to submersibles, have motors designed to operate in air, and are used wherever the motor is not subject to being immersed in water. Because air is a much less effective cooling medium, motors for dry pumps are typically equipped with a fan mounted to the drive shaft to generate a stream of cooling air over the outside of the motor. A particularly common type of motor used to power dry pumps is known as a totally-enclosed, fan-cooled, or TEFC, motor. In a TEFC motor, the casing forms a sealed container around the motor armature to seal against contamination. As a result of this sealing, TEFC motors are substantially waterproof, and may even be submerged for short periods of time while idle. However, if a TEFC motor is operated under water, the cooling fan would generate so much increased drag relative to operation in air that the motor would become overloaded and burn out. Thus, existing TEFC motors have not been suitable for operation, even temporarily, under water.

In some pump applications, the pump is normally expected to operate in air, but may under some circumstances become immersed for periods of time. This may occur, for instance, where a pumping station is inundated during a flood, or a sump pump fails to keep up with influx to a sump pit. In many cases, it is important that the pump continues to operate in the event of submersion. In such cases, a submersible pump/motor combination has been used and simply operated in air under normal circumstances. However, because the air cannot cool the motor as effectively as water, some additional provision must be made to cool the motor. For instance, the motor may be oversized and run at less than rated capacity to thereby provide additional surface area to enhance cooling. In some cases a cooling jacket is used to circulate pumpage or oil around the motor. Unfortunately, these systems for cooling add significantly to the expense of a motor that is already more expensive than a comparable TEFC motor. By way of example, a submersible pump/motor combination designed to operate in air may be more than three times as expensive as a comparable dry system. Another disadvantage of these solutions is that a submersible motor must be directly connected to the pump and can not be connected through an intermediate frame as is known in the art.

Previous attempts to cool a submersible pump/motor combination operating in air have included installing a cooling fan separate from the motor. A shroud extends around the fan and the motor to direct the air over the motor. This solution can significantly add to the setup requirements and expense of the pump. In addition, this solution may not be physically practical in some pumping applications.

It is therefore an object of the present invention to provide an economical pump/motor system for use in an environment that may be subject to periodic immersion.

It is a further object of this invention to provide such a system which can make use of existing TEFC motor designs.

More generally, it is an object of the present invention to provide a fan-cooled electric motor that will not be overloaded by drag from the fan when operated underwater.

The difficulties and problems found in past dry-pit submersible pumps are overcome by using a modified TEFC electric motor to power the pump and by providing a release mechanism to prevent the fan from creating excessive drag when submerged in water. Air from the fan cools the motor when the water level is below the motor, and the surrounding water cools the motor when the water level rises to at least partially surround the motor. When the fan is at least partially submerged, the release mechanism prevents the fan from imposing an excess load on the motor due to the surrounding water.

These and other objects, advantages and novel features of the invention will be set forth in part in the description which follows.

DETAILED DESCRIPTION OF THE PREFERRED EMBODIMENT

Figure 1:
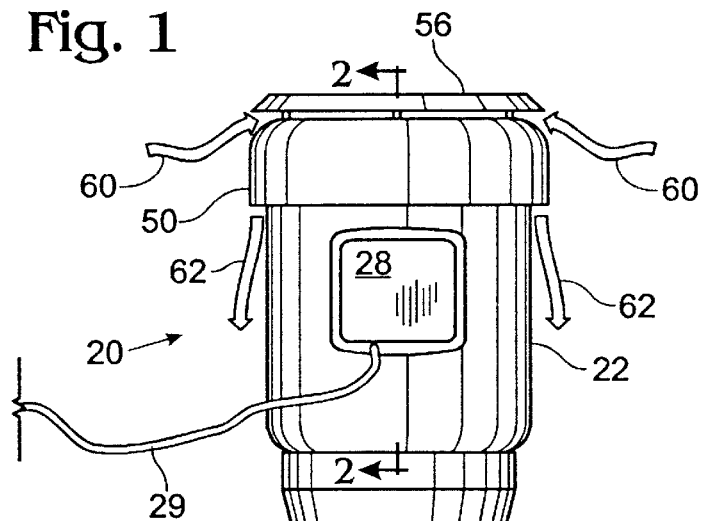
FIG. 1 is a side view of a fan-cooled dry-pit submersible pump according to the present invention.

A fan-cooled dry-pit submersible pump according to the present invention is shown generally at 10 in FIG. 1. Pump 10 includes an impeller 12 which moves water or other liquid from an inlet 14 through an outlet 16. Impeller 12 is driven by electric motor 20, which is preferably a substantially standard TEFC motor with modifications as described below. Other types of motors could be used as well provided they are capable of operation in a submerged condition.

Motor 20 is enclosed in a substantially waterproof casing 22 which allows motor 20 to continue to operate when surrounded by water. In addition to the standard TEFC motor seals, motor 20 is further protected by O-rings 21 and 23, lip seals 24, 25, 26, and mechanical seal 27. Submersible conduit box 28 is attached to casing 22. Submersible cable 29 is connected to conduit box 28 and enables motor 22 to be safely powered in a submerged state. Power from motor 22 is output through a drive shaft 30, which is rotatable with respect to casing 22 via bearings 31. First end 32 of shaft 30 is operationally connected to impeller 12. A second end 34 of shaft 30 extends outside of casing 22 and contains a shaft bore 36 which is orthogonal to the normal axis of rotation of shaft 30.

Figure 3:
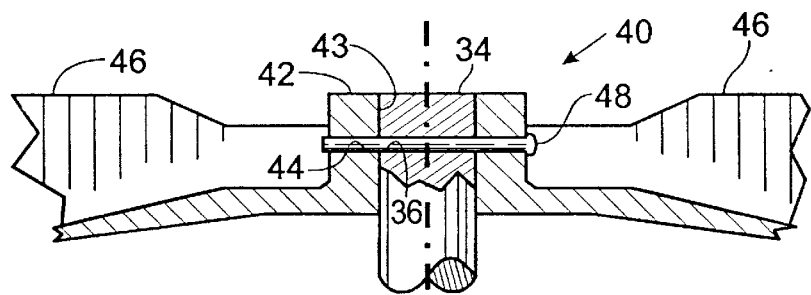
FIG. 3 is a sectional view of the motor-fan connection according to one embodiment of the present invention.
Figure 2:
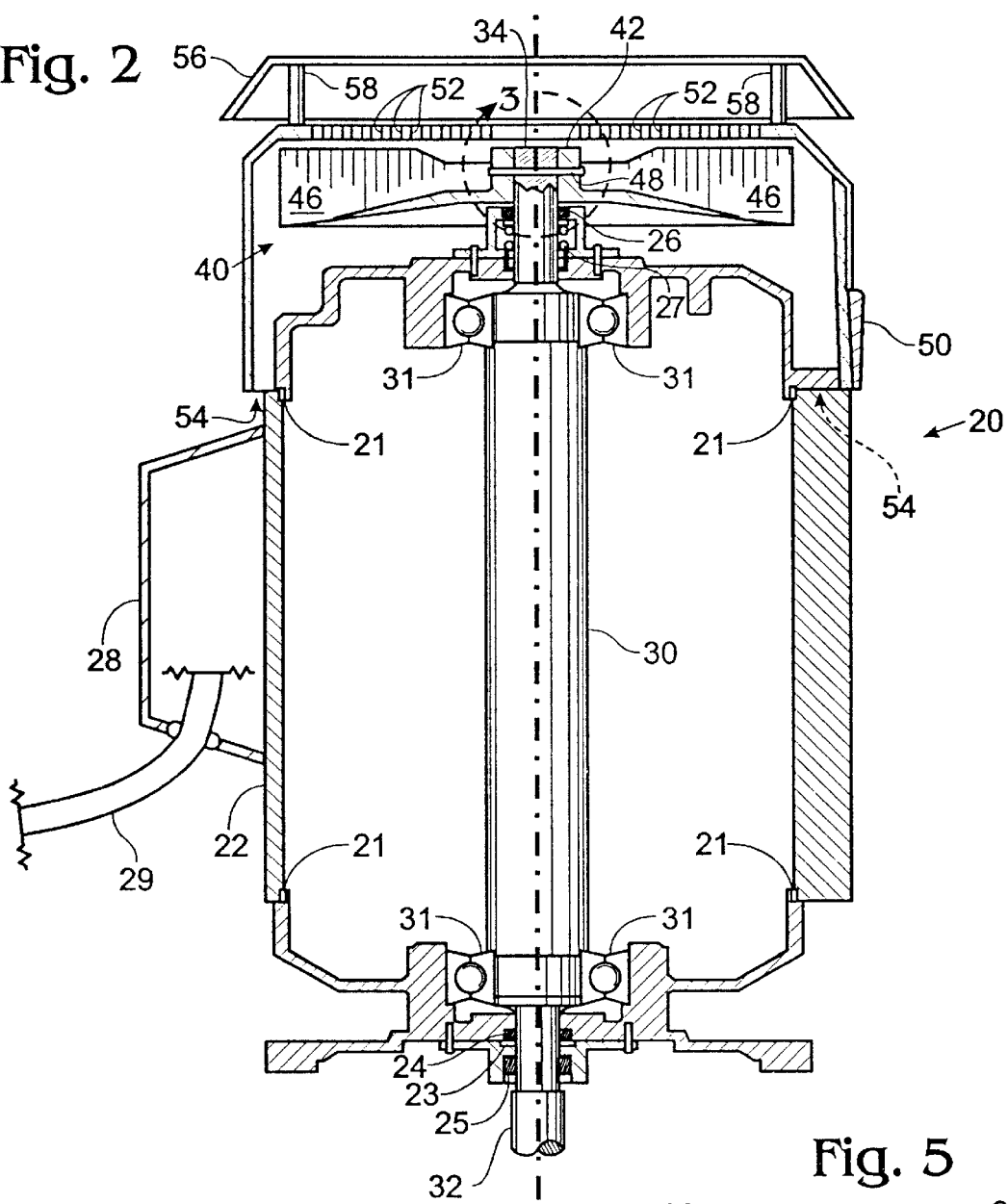
FIG. 2 is a sectional view of the electric motor of the present invention.

A cooling fan 40 is disposed above casing 22. In a preferred embodiment, fan 40 has a plurality of blades 46 designed to direct air to cool motor 20. Alternatively, fan 40 could have as few as one blade. As shown in detail in FIG. 3, base 42 of fan 40 has a central bore 43 which is of sufficient diameter to be loosely mounted on second end 34 of shaft 30. A fan bore 44 is provided at least partially through base 42. Fan bore 44 has a diameter similar to the diameter of shaft bore 36. Fan 40 is placed on shaft 30 so that shaft bore 36 and fan bore 44 are coaxially aligned with respect to each other. A shear key or shear pin 48 is inserted through shaft bore 36 and fan bore 44. Shear key 48 comprises a torque-transferring connection between shaft 30 and fan 40. Shear key 48 can be made of any suitable material, such as plastic or metal. A fan housing 50 is situated on one end of casing 22 and surrounds fan 40. Vent holes 52 are disposed at the top of fan housing 50. An annular passage 54 is created between fan housing 50 and casing 22. A shroud 56 is attached to fan housing 50 by bolts or posts 58. Shroud 56 helps direct air to fan 40. Shroud 56 protects fan 40 from damage due to solid objects falling into the fan during operation.

When motor 20 is operated in a non-submerged condition, shaft 30 drives fan 40. Fan 40 draws air into shroud 56 and through vent holes 52 as shown by arrows 60 in FIG. 1. The air is directed by blades 46 through annular passage 54 and along the outside of casing 22 as shown by arrows 62 in FIG. 1 to cool the motor.

Because motor 20 is substantially completely sealed inside casing 22 and electrically sealed due to submersible conduit box 28, motor 20 will continue to operate without electrical shorting when the level of the surrounding water rises to partially submerge motor 20. In a partially submerged state, fan 40 continues to be driven by motor 20. Motor 20 is thereby cooled both by the air directed by fan 40 and by the surrounding water.

When the water level reaches fan 40, the drag created by blades 46 as they rotate in the water causes shear key 48 to break. When shear key 48 breaks, there is no torque-transferring connection between motor 20 and fan 40, and fan 40 ceases to be powered by motor 20. As the water level recedes, an operator can temporarily shut off motor 20 and quickly replace shear key 48.

Figure 4:
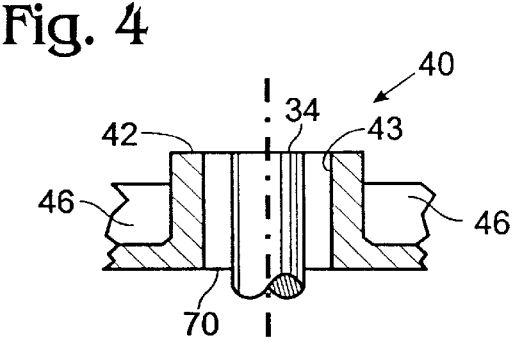
FIG. 4 is a sectional view of the motor-fan connection according to another embodiment of the present invention.

It is within the scope of the present invention to include any submersible fan-cooled electric motor having a connection or arrangement whereby a load due to the fan rotating in water is reduced or eliminated. By way of example, FIG. 4 shows an alternate embodiment of the present invention wherein a torque-release clutch 70, shown schematically, is disposed between shaft 34 and central bore 43 of fan 40. Clutch 70 provides a torque-transferring connection between motor 20 and fan 40 when fan 40 is operating in air. Clutch 70 is designed to release the connection when a predetermined torque load is placed upon motor 20 due to fan 40 resisting rotation. Alternatively, clutch 70 can be designed to limit the torque to a predetermined maximum to thereby prevent overloading.

Figure 6:
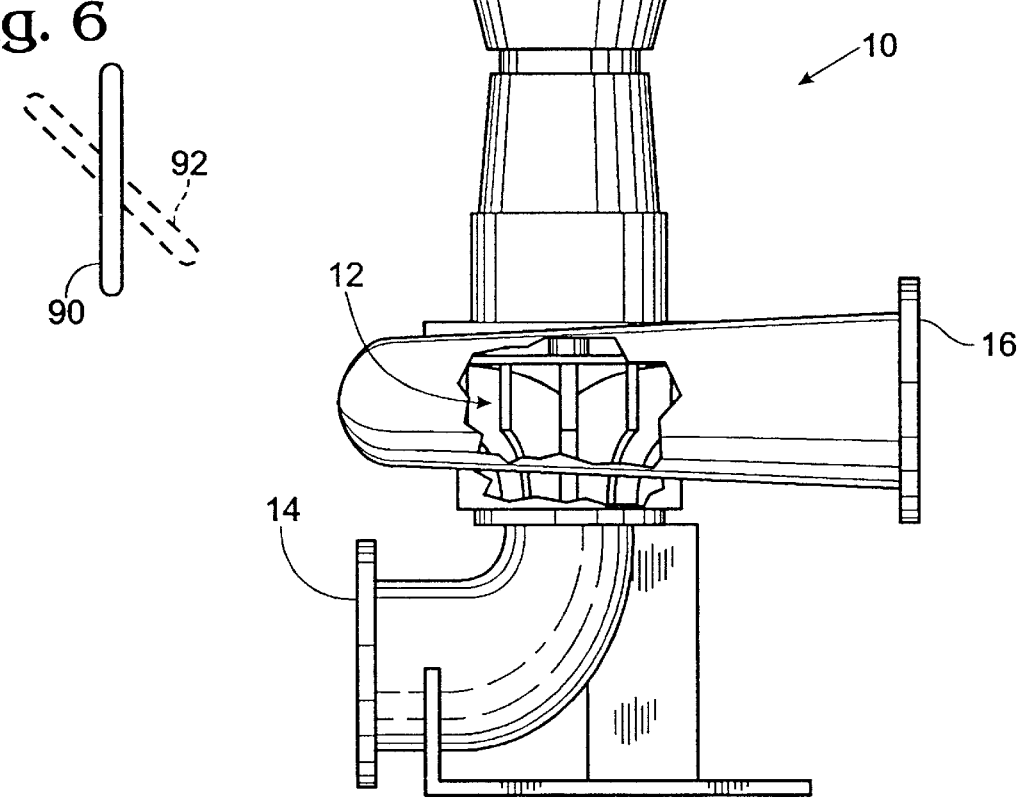
FIG. 6 is an end view of a fan blade according to yet another embodiment of the present invention.
Figure 5:
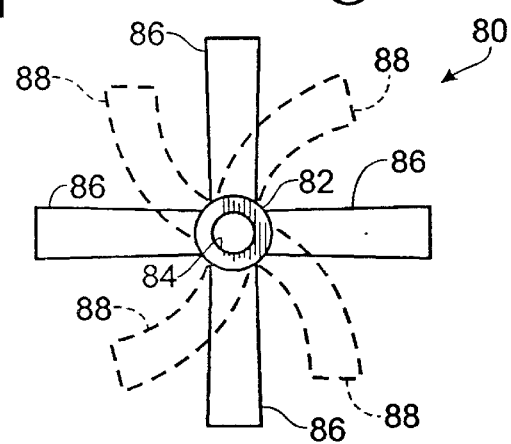
FIG. 5 is a top view of a fan according to yet another embodiment of the present invention.

In a further embodiment of the present invention shown in FIG. 5, the torque-reducing arrangement may also take the form of a fan 80 having a base 82 and a central bore 84 which is non-rotatably fastened to second end 34 of shaft 30. Flexible blades 86 are attached to base 82 and are formed of a bendable, resilient material. When flexible blades 86 are rotated in water, flexible blades 86 bend as shown at 88. Flexible blades 86 thus reduce the load on motor 20 when flexible blades 86 rotate in water. Alternatively, the fan blades may be designed so that the pitch of the blades may change when rotated in water. FIG. 6 is an end view of a fan blade 90, which when subjected to a predetermined load will bend as shown at 92 so that the pitch of blade 90 is changed. This change in pitch of blade 90 reduces the load on motor 20 due to blade 90 rotating in water.

Although the present invention has been described in the context of a pump system, it is also possible to utilize a fan-cooled motor constructed according to the present invention in other applications as well.

The foregoing description of the preferred embodiments of the invention has been presented for purposes of illustration and description. It is not intended to be exhaustive or to limit the invention to the precise form disclosed, and many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A dry-pit submersible pump, comprising:
   an impeller;
   an electric motor operationally connected to said impeller, said motor driving said impeller;
   a fan operationally connected to said motor, said fan being driven by said motor and thereby imposing a load on said motor; and
   a torque-relieving mechanism operationally connected adjacent a circumference of an electric motor shaft between said motor and said fan to limit the load imposed on said motor by said fan when said fan is in an at least partially submerged condition so that said motor does not become overloaded by drag created by the fan running in water.

2. The pump of claim 1, wherein said fan assists in cooling said motor when liquid does not totally surround said motor.

3. The pump of claim 1, wherein said torque-relieving mechanism comprises a shear key operationally connected between said motor and said fan.

4. The pump of claim 1, wherein said torque-relieving mechanism comprises a clutch operationally connected between said motor and said fan.

5. The pump of claim 4, wherein said clutch provides a torque-transferring connection between said motor and said fan when said load is at or below a predetermined level, and further wherein said clutch is operative to disconnect said connection when said load is greater than said predetermined level.

6. The pump of claim 1, wherein said motor is a totally enclosed, fan-cooled (TEFC) electric motor.

7. The pump of claim 1, wherein said motor comprises at least one substantially waterproof compartment.

8. An apparatus for transferring liquid, comprising:
   a pump;
   an electric motor operationally connected to said pump, said motor adapted to be submerged for at least part of its operation, said motor comprising at least one substantially waterproof compartment;
   a fan operationally connected to said motor and driven by said motor;
   a release mechanism disposed adjacent a circumference of an electric motor shaft between said motor and said fan; and wherein said release mechanism limits torque transfer from said motor to said fan when said fan is at least partially submerged.

9. The apparatus of claim 8, wherein said release mechanism comprises a shear key.

10. The apparatus of claim 8, wherein said release mechanism comprises a clutch.

11. A torque-relieving connection comprising:

a cooling fan having:
   a central base with a bore centrally disposed therethrough, wherein a diameter of the bore is similar to a diameter of an electric motor shaft, said bore is coaxially disposed on the electric motor shaft, said torque-relieving connection is operationally disposed between the central base of the cooling fan and the electric motor shaft of an electric motor which drives a pump, said electric motor cooperates with said torque-relieving connection to allow the electric motor to operate both in submerged and non-submerged conditions.

12. The torque-relieving connection of claim 11, wherein said torque-relieving connection comprises a shear key.

13. The torque-relieving connection of claim 11, wherein said torque-relieving connection comprises a clutch operationally connected between said motor and said fan.

14. The torque-relieving connection of claim 13, wherein said clutch provides a torque-transferring connection between said motor and said fan when said load is at or below a predetermined level, and further wherein said clutch is operative to disconnect said connection when said load is greater than said predetermined level.

15. The torque-relieving connection of claim 11, wherein said motor comprises a totally enclosed fan-cooled (TEFC) electric motor.

16. An electric motor capable of running both in a submerged condition and in a non-submerged condition, comprising:

a cooling fan operationally connected to said motor, and driven by said motor to cool said motor during operation in the non-submerged condition, and thereby imposing a load on the motor; and a shear key operationally connected adjacent a circumference of an electric motor shaft, between said fan and said motor to limit the load imposed on said motor by said fan when said motor is operated in an at least partially submerged condition.

17. A method of transferring liquid, comprising the steps of:

providing a pump;

driving said pump via an electric motor;

cooling said motor at least partially via a fan driven by said motor;

providing a torque-relieving mechanism adjacent a circumference of an electric motor shaft, operationally connected, between said motor and said fan to at least substantially reduce any load imposed on said motor by said fan when said fan is in an at least partially submerged condition.

* * * * *